March 11, 1969  G. RASMUSSEN ET AL  3,432,857
RESCUE SIGNALING SYSTEM

Filed Jan. 31, 1967  Sheet 1 of 2

INVENTORS
GEORGE RASMUSSEN
ROBERT J. SPELLMIRE
BY Allen F. Bohney
ATTORNEY

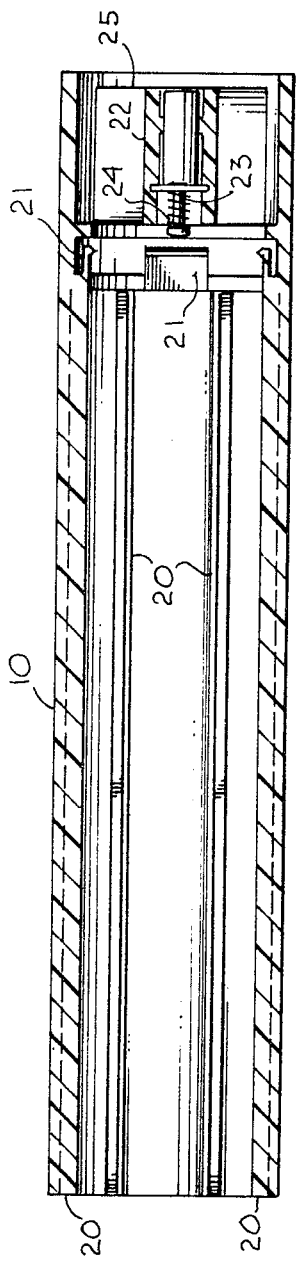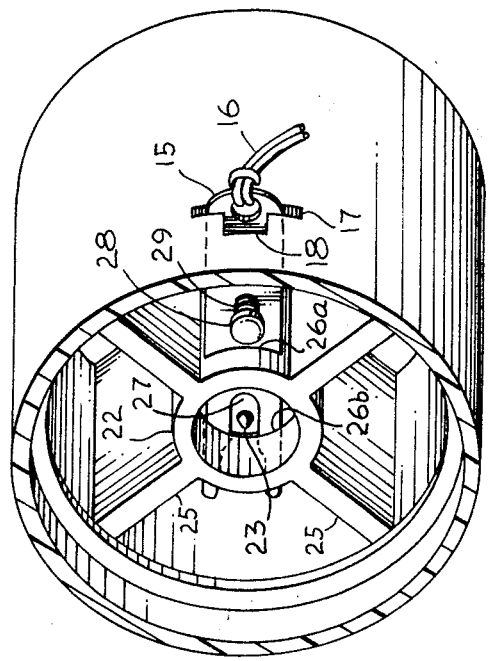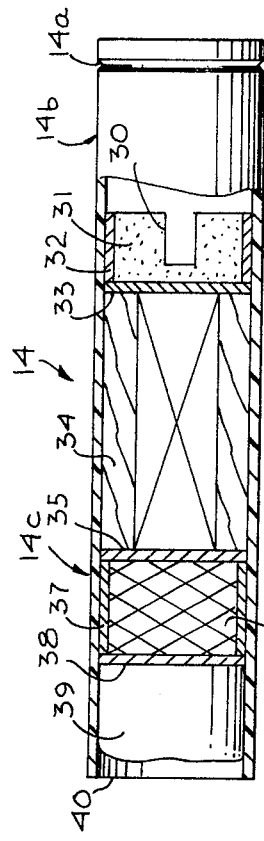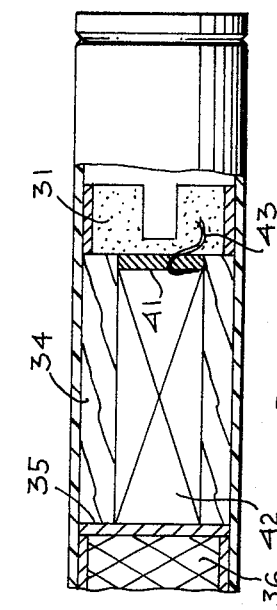

United States Patent Office 3,432,857
Patented Mar. 11, 1969

3,432,857
RESCUE SIGNALING SYSTEM
George Rasmussen, Long Beach, and Robert J. Spellmire, San Marino, Calif., assignors, by mesne assignments, to Pike Corporation of America, Los Angeles, Calif., a corporation of California
Filed Jan. 31, 1967, Ser. No. 613,015
U.S. Cl. 343—18
Int. Cl. G01s 7/00
4 Claims

ABSTRACT OF THE DISCLOSURE

A signaling system comprising: a rocket propelled shell which contains chaff capable of reflecting a radar beam and means for discharging the chaff into the atmosphere to form a radar beam reflecting cloud. The shell launching apparatus includes a tube into which the shell is inserted at one end and a manually operated shell firing mechanism mounted on the other end. The shell is rocket propelled.

---

The present invention relates in general to discovery and location systems, and more particularly relates to a system of the type mentioned wherein rocket-propulsion means are employed to launch either a flare or a cloud of radar chaff, or both, to discover and locate an object.

As is well known, if the survivors of a shipwreck are to be saved from drowning or starvation, the lifeboat or liferaft in which they may be aimlessly wandering the ocean must be quickly discovered and located. The same is true with respect to the survivors of a plane crash who may find themselves in an extremely hostile environment, such as the depths of a jungle, the winding canyons of a mountainous terrain, or the wastelands of the polar regions. In any of the instances mentioned, the feat of initially detecting the location of those in distress has been a difficult one to accomplish, especially to accomplish it quickly, and various systems have been used in the past for these purposes. However, none of these earlier systems have been entirely satisfactory in that they have been limited to relatively small operating ranges, and their degree of accuracy leaves something to be desired.

More specifically, one technique that has been frequently employed in the past is that of sending up a flare, which has been easily accomplished by means of a flare gun. However, the trouble with this kind of device is that its effectiveness is entirely dependent on factors involving visibility. Thus, for example, since the average person can only see a few miles ahead, even in the clearest of weather, where planes are sent out on a search mission the planes would necessarily have to be in what may be termed the immediate vicinity of the flare before it could be detected.

The problem is aggravated by the fact that flare guns have a rather limited range, with the result that the flares usually rise to only a few hundred feet, thereby further limiting the opportunity for detection. Of course, the problem of detection is especially acute in the event of inclement weather, such as fog or cloud overcast, and in that kind of situation the use of flares would obviously be fruitless.

Another technique that has occasionally been used is that of carrying a highly compact radio transmitter which, in case of an emergency, is made to transmit a homing signal whose distant origin can be distantly determined by the art of triangulation. However, this technique also has severe limitations, first, because it requires two receiving stations in range of the transmitter and, second, because of the beam angle in the antenna patterns of the receiver stations the accuracy of this kind of sytstem leaves a great deal to be desired in that, while the general location of the signal source is indicated, it still leaves a considerable area to be searched.

It is, therefore, an object of the present invention to provide a system that will quickly and accurately indicate the location of an object to be found.

It is another object of the present invention to provide a discovery and location system of extended operating range.

It is a further object of the present invention to provide a rescue aid that is operative and effective in all kinds of weather.

It is an additional object of the present invention to provide a discovery and location system that is of relatively simple construction and relatively inexpensive.

The present invention overcomes the above and still other disadvantages and limitations of prior art systems, first, by combining the principles of radar with those of chaff particles and, second, by utilizing rocket-propulsion techniques to propel either the chaff particles or a chaff and flare combination high into the air. According to the basic concept of the invention, rescue is facilitated and expedited by producing a cloud of chaff from which a radar beam can be reflected, a single radar beacon providing both direction and range and, therefore, location. Toward this end, a chaff-dispensing device is used that is propelled to a desired altitude before it dispenses and disperses the chaff packaged therein. The chaff, once dispersed, becomes a reflective medium for the radar, thereby making it possible to determine the location of a person or persons in need of aid.

In a preferred embodiment of the invention, the chaff is contained in a cylindrically-shaped shell that is adapted to be rocket-propelled into the atmosphere. When used, the shell is a manually operated percussion-type firing mechanism. This tube is held in one hand by the user and fired with the other hand, the shell thereby being launched into the atmosphere in the direction in which the tube is oriented. Upon reaching a pre-designed altitude, the chaff is dispensed to form the desired reflective cloud. The shell and its launcher are relatively light and compact, and provision is made for the shell to be kept in the launcher with complete safety, with the result that one or more of these devices may easily be kept on the person or conveniently stored.

Some of the advantages of the present invention have already been intimated, if not expressly stated. Thus, with an embodiment of the present invention, the location of an object site, such as the whereabouts of one or more persons in need of aid, can be readily discovered irrespective of weather conditions. Moreover, since it does not depend for its effectiveness upon the visual abilities of the searcher, discovery is far more likely where a chaff signal according to the present invention is employed than where the customary flare is utilized, and such discovery is also likely to occur at an earlier time. Again, in comparison with the technique of triangulation involving the use of a signal transmitter and at least a couple of direction-findings stations, embodiments of the present invention provide the opportunity of determining location with a much higher degree of accuracy and with considerably less equipment. This is due to the fact that radar beams are relatively narrow and, furthermore, radar will supply both the direction of and range to an echo source.

Aside from the advantages already mentioned, the present invention provides still other advantages over the prior art that are altogether too numerous to completely delineate here. By way of example, in the case of a military pilot downed in enemy territory, it is possible with an embodiment of the present invention for the pilot to send up a flare that could be detected by friendly search planes but which would remain invisible to enemy eyes, thereby minimizing the danger to the pilot. It will be recognized that this is in sharp contrast to the technique of signaling with flares that can obviously be seen by friend and foe alike. On the other hand, where it is desirable to combine the features of visible flares and radar chaff, the shell can readily be adapted for such a purpose, which is another desirable aspect of the present invention since it makes possible signaling at two different levels, one a visible, low-level signal, and the other an invisible, high-level signal.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

FIGURE 3(b) is a side view, in cross-section of a launcher according to the present invention;

FIGURE 4 is a perspective view of the bottom portion of the launcher wherein the firing mechanism is contained;

FIGURE 5 is a side view, in cross-section, of a shell according to the present invention; and FIGURE 6 is a side view, in cross-section, of a portion of the FIG. 5 shell to illustrate a modification thereof.

Figure 1:
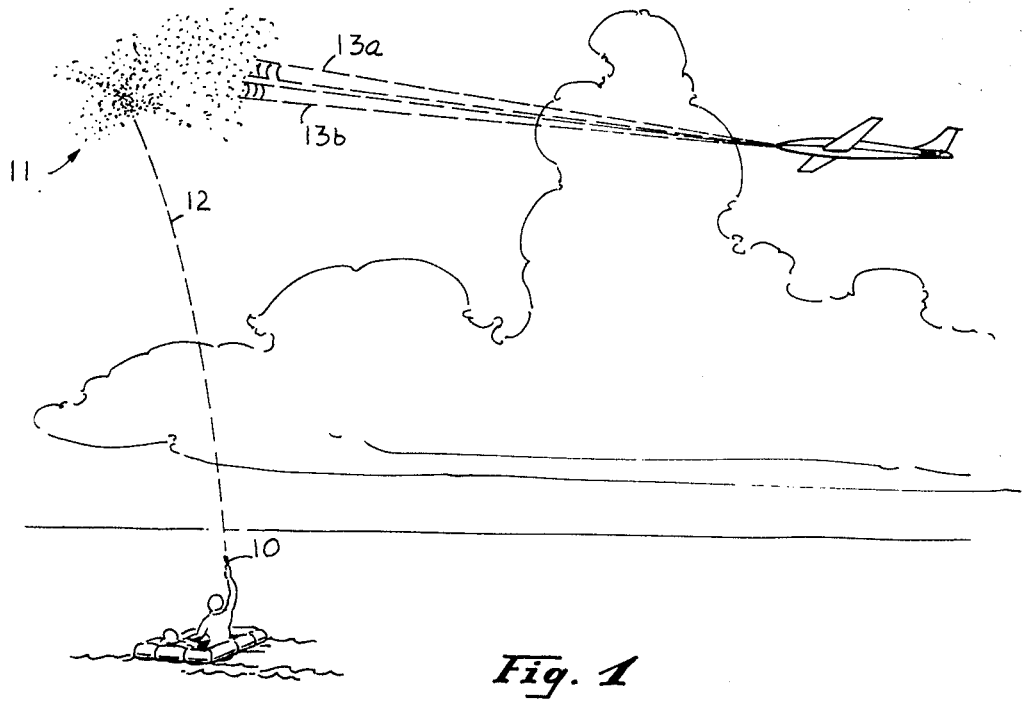
FIGURE 1 is a view that broadly illustrates the system of the present invention and the concepts involved therein.

Considering now the drawings, wherein like or similar parts or elements are given like or similar designations, reference is initially made to FIG. 1 wherein the principles underlying the present invention are depicted. As shown therein, a group of persons are in a liferaft, lost on the high seas, very likely as the result of some sea disaster. Accordingly, they are in distress and, therefore, in need of help. Furthermore, it is assumed that radar-equipped planes are out looking for them, one such search plane being shown in the figure. In this regard, it should be mentioned that most modern-day planes are equipped with radar.

It will also be assumed that those in the liferaft are equipped with rescue-aid apparatus according to the present invention, namely, a shell by means of which a cloud of chaff can be formed in the atmosphere and a launcher for shooting that shell to the desired altitude. Such a launcher, designated 10, is shown in FIG. 1 which also illustrates a cloud of chaff, generally designated 11, at some height above the raft. The trajectory of the projectile carrying the chaff and adapted to dispense it at the appropriate time is indicated by the broken line designated 12.

The chaff is designed to reflect a radar beam, such as the beam 13a sent out from the plane in the figure, with the result that an echo signal 13b is received in the plane that informs its occupants of the position of the chaff cloud and that the persons being sought are located beneath it. It should be emphasized at this point that since radar systems are capable of scanning wide areas, and for relatively great distances, chaff cloud 11 and, therefore, the raft beneath it, can be detected and its position accurately determined while the search plane is still a considerable distance away from it. This, of course, is in sharp contrast to the techniques mentioned earlier.

Figure 2:
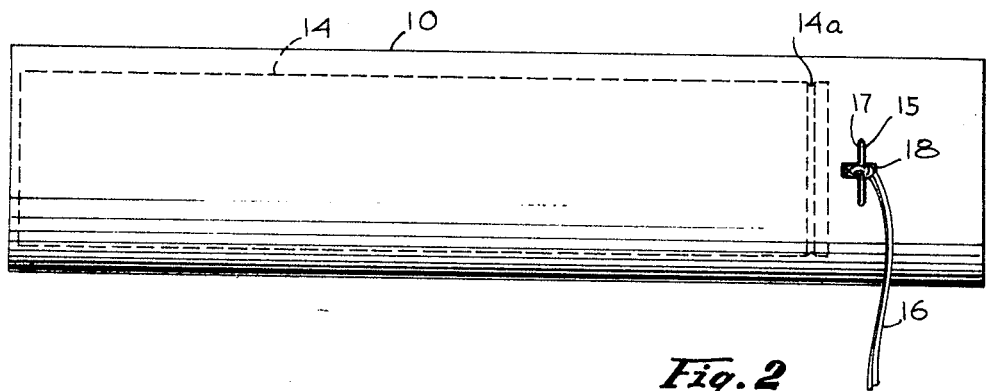
FIGURE 2 is a side view of a launcher according to the present invention, the broken-line outline of a shell also being shown to illustrate the mounting of the shell therein.

A side view of launcher 10 is shown in FIG. 2, the outline of a shell, designated 14, also being shown by means of a broken line to indicate how the shell is mounted in the launcher for firing purposes. Thus, the upper portion of the launcher is basically a hollow tube and the shell is mounted in the hollow of the tube, the means by which the shell is fired being located at the base of the tube which, in the figure, is the right end of the tube. To hold the shell in place, there is a groove 14a located at the base of the shell and the manner in which the groove aids in this respect will be explained more fully below. The firing means shown in FIG. 2 includes a key 15, made of metal or some other sturdy material, to which a string 16 is attached and it is the pulling of this string that initiates the firing of shell 14. Key 15 is fitted or mounted in a key way 17 and when string sixteen is pulled with sufficient force, the key comes out of this opening to thereby allow the internal portions of the firing mechanism to operate. Finally, it will be noted from FIG. 2 that the base wall of tube 10 also has a rectangular opening 18 through it that intersects key way 17, the function and purpose of this opening 18 to become clearer later.

Figure 3A:
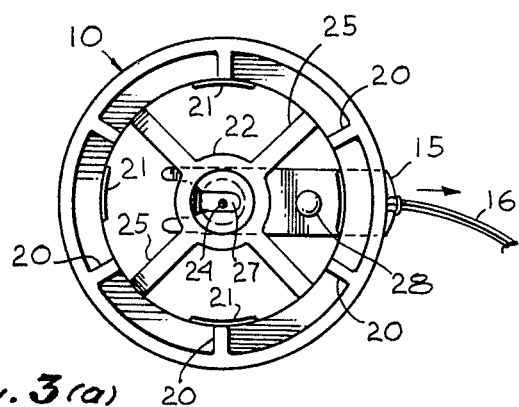
FIGURE 3(a) is a top view of a launcher according to the present invention.

A more complete understanding of the construction and operation of launcher 10 may be had from FIGS. 3(a), 3(b) and 4 to which reference is now made. As shown therein, the launcher is a cylindrically-shaped tube, the portion above the firing mechanism, which is the longer portion of the tube, being hollow to receive a shell. The inside surface of this hollow portion is ribbed, there preferably being six ribs equally spaced around the periphery of the tube. The ribs are designated 20 and they extend down into, that is to say, longitudinally along the tube until they reach the base portion of the tube where they end just above the firing structure. The purposes of these ribs are, first, to provide structural strength for the launcher and, second, to reduce the air drag on the shell as it leaves the tube after it is fired, this being achieved because the ribs provide the proper spacing between the shell and the wall of the launcher tube.

Also mounted in this hollow portion of the launcher tube, at the base thereof and extending somewhat into the space containing the firing mechanism, are a plurality of finger elements 21, there preferably being four such finger elements equidistantly spaced around the periphery of the tube. These finger elements enter the groove 14a of a shell 14 when one is mounted inside launcher 10 and, after firing, hold the shell in place until sufficient thrust has been built up or generated to properly launch the shell, thereby enhancing the stability and accuracy of the rocket. When firing does take place, the forward thrust and initial motion of the shell forces these finger elements out of the groove, thereby releasing the shell from any impediment to its forward motion. Prior to firing, these same finger elements prevent the shell from falling out of the tube should it be held with its muzzle downward.

Looking now to the bottom portion of the launcher tube, that is to say, to that portion of it that contains the firing mechanism, it can be seen from FIGS. 3(a), 3(b) and 4 that this bottom structure includes a centrally disposed cylindrical chamber 22 in which a spring-loaded firing pin is axially located, the pin being designated 23 and its associated spring being designated 24. As can be seen from FIGS. 3(a) and 4, a chamber 22, which is structurally supported by means of radial ribs 25, has a pair of slits 26a and 26b extending transversely through its wall that are in alignment with opening 17 through the launcher wall, and plate or key 15 extends through both these slits to the other side of the chamber.

As can be seen more clearly from FIGS. 3(a) and 4, the forward portion of plate or key 15 is generally U-shaped, the opening or spacing between the arms of this U, designated 27, being narrow enough to prevent the firing pin from rushing forward to strike the shell that might be in the launcher tube at the time. In short, key 15 is a release mechanism that releases the firing pin from its restrained position only when the key is withdrawn from slits 26a and 26b. As previously mentioned, this is accomplished when the user pulls on string 16. Finally, in order to prevent any premature firing or operation of the firing mechanism, the firing mechanism also includes a safety device that prevents the key 15 from being pulled out until the user is ready for it. More specifically, this safety device comprises a spring-loaded pin or similar type element that is mounted perpendicularly to key 15, in an opening therethrough located in the area between slit 26a and opening 18, as is shown in FIGS. 3(a) and 4. The pin is designated 28 and the spring thereon is designated 29, the pin, because of the spring, normally being in a fully upright or extended position above the key, with the result that normally the pin will not clear or pass through opening 18. This means that pin 28 is long enough so that in its normally extended position it will abut against the wall of the launcher tube above opening 18 and thereby prevent the key from being pulled out to thereby, in turn, prevent the release of firing pin 23.

Pin 28 may be held on key 15 by means of a C-washer or clamp located on the other side of the key and, therefore, not shown because of the particular orientation or perspective of the figures. Suffice it to say that only with a shell seated in position and with the finger elements in its groove does the bottom surface of the shell contact pin 28 and depress it against the action of spring 29. Hence, only with a shell fully in the tube does pin 28 clear or pass through opening 18 to permit complete withdrawal of key 18.

A shell 14 that may be used in a system according to the present invention is shown in greater detail in FIG. 5 to which reference is now made. As shown therein, the shell basically comprises a rocket motor section designated 14b and a payload section designated 14c, the rocket motor itself being well known in the art and of a type that is commercially available. Stated differently, the rocket motor is a standard type and, therefore, no part of the invention resides in the rocket motor construction per se. Accordingly, it is not deemed necessary to go into any detailed explanation of its construction and operation since both are generally known. It should be mentioned, however, that this rocket motor section does include a delay fuse 30 that protrudes somewhat into the payload section for reasons that will be presented below. It should also be mentioned that many delay fuse mechanisms are available and well known and any one of them may be utilized for the purposes of the present invention. M.B. Associates of San Ramon, Calif., is an example of one company that has for some time been manufacturing and selling such rocket motor sections, including the delay fuses.

As to the payload section 14c, it includes a succession of chambers, four such chambers being shown in the figure, in which various items are respectively contained. More specifically, the first chamber, which is located just forward of the rocket motor section, contains or is filled with gunpowder 31, and the aforesaid delay fuse 30 protrudes into the gunpowder to some extent. This first chamber is formed by means of a spacer ring 32 which is enclosed by the rocket motor section at the rear end thereof and a spacer disc 33 at its front end. The second chamber is located forward of the first chamber and is formed by means of a spacer plug 34 and a pair of spacer discs, namely, disc 33 and a disc 35, respectively covering the ends of the plug. This second chamber, as it is shown in FIG. 5, doesn't contain any active ingredient, the spacer plug being mounted therein merely to reserve the space should it be desirable to place an active ingredient therein, such as a flare material. The chaff, in package form, is mounted in the third chamber inside the shell, which is located just forward of spacer disc 35. The chaff is designated 36 and is bounded by spacer ring 37, spacer disc 35 and a spacer disc 38. Finally, the fourth chamber, in front of and at the forward end of the shell, contains an end plug 39 that is enclosed in the shell by means of disc 40.

In operation, when string 16 is pulled, pin 23 strikes shell 14, the percussion thereby firing the rocket motor in the shell. As a result, the shell is launched into the atmosphere in the chosen direction. At the same time that the rockets are fired, the delay fuse 30 is also activated and, therefore, after a predetermined interval of time, the fuse supplies a flame to powder 31 which thereby ignites. As may be expected, the ignition of the powder produces a small explosion, the force of the explosion being applied substantially equally against disc 33, with the result that the shell's contents, including the chaff, are thereby projected out into the atmosphere. When this occurs, the package of chaff is no longer constrained and the chaff therefore begins to spread because of the motion imparted to it until a substantial chaff cloud is formed, as was intended.

In the event it is desired to combine the features of radar chaff with those of visible flares, the shell 14 of FIG. 5 may be modified in the manner shown in FIG. 6 to make this possible. As shown therein, the modification consists of substituting a pad 41, such as a felt pad, for spacer disc 33, the pad 41 being snugly fitted into the spacer plug at that end. The flare material, designated 42, is mounted within the spacer plug between disc 35 and pad 41, and is coupled to gunpowder 31 by means of a wick 43 which extends through the pad from the flare material to the gunpowder. In this modified version of the shell, the gunpowder, when it is ignited, also ignites wick 43 which thereafter burns and continues to burn until the flare material itself is ultimately ignited.

Although a particular arrangement of the invention has been illustrated above by way of example, it is not intended that the invention be limited thereto. Accordingly, the invention should be considered to include any and all modifications, alterations or equivalent arrangements falling within the scope of the annexed claims.

Having thus described the invention, what is claimed is:

1. A signalling system comprising:
    a rocket propelled shell including chaff capable of reflecting a radar beam and means for discharging said chaff into the atmosphere to form a radar beam reflecting cloud;
    shell launching apparatus including a tube having an open end and a closed end, said tube being of sufficient inside diameter that a shell may be easily inserted into said tube for discharge and said tube having radial structural support members at the closed end thereof and having a manually operated shell firing mechanism mounted at the closed end thereof proximate the radial structural support members, said shell firing mechanism including a spring loaded firing pin for striking said shell, a general U-shaped plate and a structure on which said plate is slidably mounted above said firing pin, the spacing between the arms of said U being narrow enough to prevent said firing pin from passing therethrough, said generally U-shaped plate constraining said firing pin against the action of its spring and being withdrawably mounted between said shell and said firing pin and said shell firing mechanism including a string hanging externally through said apparatus and attached to said plate; and,
    said firing mechanism includes a safety device that comprises an opening through the wall of the tube whereat the string is attached to the plate and a spring loaded release pin mounted on said plate perpendicularly thereto, said release pin having a length greater than the said opening in said generally U-shaped plate, through said wall of said tube, said pin being adapted to pass through said opening only when depressed by a shell in said tube.

2. In a signalling system comprising; a rocket-propelled shell including chaff capable of affecting a radar beam and means for discharging said chaff into the atmosphere to form a radar beam reflecting cloud; and, shell launching apparatus that includes a tube into which said shell is inserted at one end and a manually operated shell firing mechanism mounted on the other end, said apparatus being adapted so that the tube thereof is held so it can be oriented with one hand and its firing mechanism operated with the other hand, the operation of said firing mechanism igniting the rocket fuel in the shell to propel it into the atmosphere; the improvement to said tube wherein said tube includes a plurality of rib structures spaced along the inside surface thereof and extending longitudinally along said tube parallel to the tube axis, said rib structures adding rigidity to the tube and properly spacing the shell therefrom to minimize air drag thereon when the shell is propelled forward.

3. In a signalling system comprising a rocket propelled shell including chaff capable of reflecting a radar beam; means for discharging said chaff into the atmosphere to form a radar beam reflecting cloud; and a shell launching apparatus including a tube having an open end and closed end, said tube being of sufficient inside diameter that the shell may be easily inserted into said tube for discharging and said tube having radially structural support members at the closed end thereof and having manually operated shell firing mechanism mounted at the closed end thereof proximate the radial structural support member and where said tube is adaptable to being oriented by hand and to having a shell inserted into the open end thereof and being attached proximate the closed end thereof adjacent said firing mechanism; the improvement comprising; a plurality of rib structures spaced around the inside surface of said tube and extending longitudinally along said tube, parallel to the tube axis, said rib structures adding rigidity to said tube and properly spacing the shell therefrom to minimize air drag thereon when the shell is propelled forward.

4. The improvement defined in claim 3 wherein said rib structures extend along said tube down to approximately said radial structural support members.

References Cited

UNITED STATES PATENTS

| | | | |
|---|---|---|---|
| 1,299,972 | 4/1919 | Linscott | 42—78 |
| 2,436,751 | 2/1948 | Hammell et al. | 102—37.6 |
| 2,519,123 | 8/1950 | Dwyer et al. | 42—1 |
| 2,785,632 | 3/1957 | Clauser et al. | 102—34.4 X |
| 3,049,080 | 8/1962 | Schermuly | 102—34.4 |
| 3,081,702 | 3/1963 | Klostermann et al. | 102—37.6 |

FOREIGN PATENTS 898,035  6/1962  England.

RODNEY D. BENNETT, JR., *Primary Examiner.*

BRIAN L. RIBANDO, *Assistant Examiner.*

U.S. Cl. X.R.

42—1